US011071292B2

(12) United States Patent
Hauff

(10) Patent No.: US 11,071,292 B2
(45) Date of Patent: Jul. 27, 2021

(54) AGRICULTURAL SPRAYER SYSTEMS AND COMPONENTS THEREOF

(71) Applicant: H.F. Hauff Co., Inc., Yakima, WA (US)

(72) Inventor: Neil Hauff, Yakima, WA (US)

(73) Assignee: H.F. Hauff Co., Inc., Yakima, WA (US)

( * ) Notice: Subject to any disclaimer, the term of this patent is extended or adjusted under 35 U.S.C. 154(b) by 83 days.

(21) Appl. No.: 16/266,721

(22) Filed: Feb. 4, 2019

(65) Prior Publication Data

US 2019/0246618 A1    Aug. 15, 2019

Related U.S. Application Data

(60) Provisional application No. 62/628,858, filed on Feb. 9, 2018.

(51) Int. Cl.
| | | |
|---|---|---|
| *A01M 7/00* | (2006.01) | |
| *A01C 23/00* | (2006.01) | |
| *A01C 23/04* | (2006.01) | |

(52) U.S. Cl.
CPC ......... *A01M 7/0057* (2013.01); *A01C 23/008* (2013.01); *A01C 23/047* (2013.01); *A01M 7/0042* (2013.01); *A01M 7/0075* (2013.01)

(58) Field of Classification Search
CPC ... A01M 7/005; A01M 7/0053; A01M 7/0075
USPC ..................................................... 239/425.5
See application file for complete search history.

(56) References Cited

U.S. PATENT DOCUMENTS

| | | | | |
|---|---|---|---|---|
| 1,502,865 A | * | 7/1924 | Moody ..................... | F04D 3/00 |
| | | | | 415/211.2 |
| 2,609,635 A | * | 9/1952 | Daugherty ............. | A01M 11/00 |
| | | | | 239/78 |
| 2,911,157 A | * | 11/1959 | Converse .............. | A01M 7/005 |
| | | | | 239/754 |
| 3,285,516 A | * | 11/1966 | Waldrum ................ | B05B 17/06 |
| | | | | 239/102.1 |
| 4,875,526 A | * | 10/1989 | Latino .................. | A62C 3/0292 |
| | | | | 169/24 |
| 4,893,755 A | * | 1/1990 | Keathley ............. | A01M 7/0014 |
| | | | | 239/167 |
| 5,028,002 A | * | 7/1991 | Whitford ............ | A01M 7/0064 |
| | | | | 239/8 |
| 5,251,818 A | * | 10/1993 | Manor ................ | A01M 7/0014 |
| | | | | 239/146 |

(Continued)

*Primary Examiner* — Viet Le
(74) *Attorney, Agent, or Firm* — Seed IP Law Group LLP

(57) ABSTRACT

An agricultural multi-row sprayer system is provided having a chassis, a tank coupled to the chassis to accommodate a sprayable mixture to be applied to rows of a crop, a first sprayer arrangement coupled to the chassis and arranged to spray the mixture from a first interrow area located between a set of adjacent rows of the crop, and a second sprayer arrangement coupled to the chassis and selectively deployable to spray the mixture from a second interrow area located between an overlapping set of adjacent rows of the crop. The sprayer system may include a linkage arrangement having a distal end that supports the second sprayer arrangement and an input link movably coupled to the chassis, which is controllably manipulable to selectively deploy the second sprayer arrangement to the second interrow area.

20 Claims, 4 Drawing Sheets

(56) References Cited

U.S. PATENT DOCUMENTS

| | | | | |
|---|---|---|---|---|
| 5,278,423 A * | 1/1994 | Wangler | ............... | A01M 7/0089 |
| | | | | 250/559.4 |
| 5,372,305 A * | 12/1994 | Ballu | ................ | A01M 7/0014 |
| | | | | 239/77 |
| 5,518,461 A * | 5/1996 | Pfordt | ................ | B60K 7/0015 |
| | | | | 475/72 |
| 5,921,019 A * | 7/1999 | Baek | ................... | A01M 7/0089 |
| | | | | 47/1.7 |
| 6,202,941 B1 * | 3/2001 | Baek | ................... | A01M 7/0075 |
| | | | | 239/161 |
| 6,702,631 B2 * | 3/2004 | Jordan | ................... | B63H 23/06 |
| | | | | 440/75 |
| 9,119,386 B2 * | 9/2015 | Tiu | .......................... | B05B 13/02 |
| 2010/0252284 A1 * | 10/2010 | Johansen | ............ | A62C 3/0292 |
| | | | | 169/46 |
| 2015/0351377 A1 * | 12/2015 | Dubose | ................. | A01M 7/005 |
| | | | | 239/1 |
| 2015/0352384 A1 * | 12/2015 | Wiley | ................... | A62C 3/0292 |
| | | | | 169/52 |
| 2019/0090413 A1 * | 3/2019 | Wildermuth | ........... | A01B 49/06 |
| 2019/0216018 A1 * | 7/2019 | Bassett | ................. | A01M 7/005 |

\* cited by examiner

AGRICULTURAL SPRAYER SYSTEMS AND COMPONENTS THEREOF

CROSS-REFERENCE TO RELATED APPLICATIONS

This application claims the benefit of U.S. Provisional Patent Application No. 62/628,858, filed Feb. 9, 2018, the contents of which are hereby incorporated by reference in its entirety.

BACKGROUND

Technical Field

This disclosure generally relates to agricultural sprayer systems and components thereof, including, in particular, multi-row sprayer systems for applying chemical mixtures to row crops.

Description of the Related Art

Multi-row sprayer systems for applying chemical mixtures to row crops are known, including self-propelled and trailerable systems that feature cantilevered boom arrangements extending from one interrow area into an adjacent interrow area. Such known systems, however, suffer from a variety of deficiencies and drawbacks, including, for example, being overly complex, bulky and/or inefficient. Accordingly, applicant believes improved agricultural sprayer systems and components thereof for spraying row crops are desirable.

BRIEF SUMMARY

Embodiments described herein provide agricultural spraying systems and related components that are particularly well adapted for applying chemical mixtures to row crops in an efficient manner.

According to one embodiment, an agricultural multi-row sprayer system may be summarized as including: a chassis; a tank coupled to the chassis to accommodate a sprayable mixture to be applied to rows of a crop; a first sprayer arrangement coupled to the chassis and arranged to spray the mixture supplied by the tank from a first interrow area located between a first set of adjacent rows of the crop; a second sprayer arrangement coupled to the chassis and selectively deployable to spray the mixture supplied by the tank from a second interrow area located between a second set of adjacent rows of the crop; and a linkage arrangement having a distal end that supports the second sprayer arrangement and having an input link movably coupled to the chassis, the input link being controllably manipulable to selectively deploy the second sprayer arrangement to the second interrow area. More particularly, with the chassis located in the first interrow area, the linkage arrangement may be configured to readily move the second sprayer arrangement between a stowed position above the chassis within the first interrow area and a deployed position within the second interrow area.

In some instances, the linkage arrangement may define at least a portion of an extendable arm that is configured to move the second sprayer arrangement within a plane transverse to a travel direction of the chassis. The extendable arm may be configured to move the second sprayer arrangement from the stowed positioned to the deployed position along a curvilinear path that initially rises, then peaks and then falls. A spatial orientation of the second sprayer arrangement may vary as the second sprayer arrangement is deployed.

In some instances, the linkage arrangement may comprise a six-bar linkage mechanism, such as, for example, a Stephenson III type linkage mechanism comprising one four-bar loop and one five-bar loop. The input link of the linkage arrangement may be coupled to the chassis via a hydraulic rotary actuator or other actuator for manipulating the input link and moving the second sprayer arrangement between the stowed position and the deployed position.

In some instances, the first sprayer arrangement may include a pair of blower assemblies mounted to a rear end of the chassis with each blower assembly oriented to spray toward a respective row of crop on opposing sides of the first interrow area, and the second sprayer arrangement may include a pair of blower assemblies mounted to the distal end of the linkage arrangement with each blower assembly oriented to spray toward a respective row of crop on opposing sides of the second interrow area when the second sprayer arrangement is deployed. The first sprayer arrangement may be mounted to a rear end of the chassis and the linkage arrangement supporting the second sprayer arrangement may be coupled to a front end of the chassis.

In some instances, the chassis may include a structural base frame supported on one or more wheel and axle assemblies and the structural base frame may define a hydraulic oil reservoir to accommodate hydraulic oil for driving one or more hydraulic motors of the sprayer system.

In some instances, the linkage arrangement and chassis may be convertible from a transport configuration, in which a motion plane of the linkage arrangement is parallel to a travel direction of the chassis, and an operational configuration, in which the motion plane of the linkage arrangement is perpendicular to the travel direction of the chassis. For example, the linkage arrangement may be unfixed from its operational position, rotated ninety degrees, and then fixed in place such that the linkage arrangement extends generally longitudinally along the chassis. Rotation may be manual or under the control of a motor such as a rotary actuator. The linkage arrangement may be mounted to the chassis via a rotatable turntable.

In some instances, the first sprayer arrangement may include a hydraulic pump and the second sprayer arrangement may include a hydraulic motor, and the hydraulic pump of the first sprayer arrangement may be configured to supply hydraulic oil to the hydraulic motor of the second sprayer arrangement. The first sprayer arrangement may include a pair of blower assemblies configured to rotate in opposite directions and the hydraulic pump may be coupled therebetween with the pair of blower assemblies and the hydraulic pump being driven by a common drive assembly. The drive assembly may include a centrifugal clutch to enable a driven shaft that is coupled to the hydraulic pump and blower assemblies to disengage from a drive power source under low speed or other conditions. The second sprayer arrangement may include a pair of blower assemblies and the hydraulic motor may be coupled therebetween with the pair of blower assemblies being driven in opposite directions by the hydraulic motor.

In some instances, the agricultural multi-row sprayer system may comprise at least one hydraulic oil conduit arranged to route hydraulic oil to or from a hydraulic component of the agricultural multi-row sprayer system, and at least one mixture conduit configured to route the mixture to or from the tank, including, for example, to one or more nozzles of the first and second sprayer arrangements. The mixture conduit may be arranged relative to the hydraulic oil conduit to enable conductive heat exchange between the mixture moving through the mixture conduit and the hydraulic oil moving through the hydraulic oil conduit. The mixture conduit may also be arranged relative to the hydraulic oil conduit such that the mixture flowing through the mixture conduit moves in a direction opposite of a direction that the hydraulic oil moves through the hydraulic oil conduit. Still further, the hydraulic oil conduit may be exposed to the surrounding environment and may circumferentially surround the mixture conduit such that heat is removed from the hydraulic oil by the mixture via conduction and heat is removed from the hydraulic oil by the surrounding environment via convection. In some instances, at least one air scoop may also be arranged to direct air over the hydraulic oil conduit as the chassis moves to enhance heat removal from the hydraulic oil via convection.

Although many features and aspects disclosed herein are described in the context of an agricultural multi-row sprayer system having an extendable arm for deploying a sprayer arrangement into an adjacent interrow area, it is appreciated that various features and aspects disclosed herein may be provided in conjunction with a wide variety of agricultural equipment and other equipment, including single row sprayer systems. For example, the various heat exchanger features described herein may be applied to hydraulic equipment having an onboard source of a cooling medium, such as, for example, a chemical mixture to be applied to crops. As another example, constructing a frame of a chassis to define a hydraulic oil reservoir may be advantageous in a variety of agricultural equipment and other equipment. Accordingly, various features and aspects disclosed herein are not necessarily limited to implementation only in connection with multi-row sprayer systems.

DETAILED DESCRIPTION

In the following description, certain specific details are set forth in order to provide a thorough understanding of various disclosed embodiments. However, one skilled in the relevant art will recognize that embodiments may be practiced without one or more of these specific details. In other instances, well-known components, structures, features or steps associated with agricultural equipment, including agricultural sprayers and agricultural processes, may not be shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1:
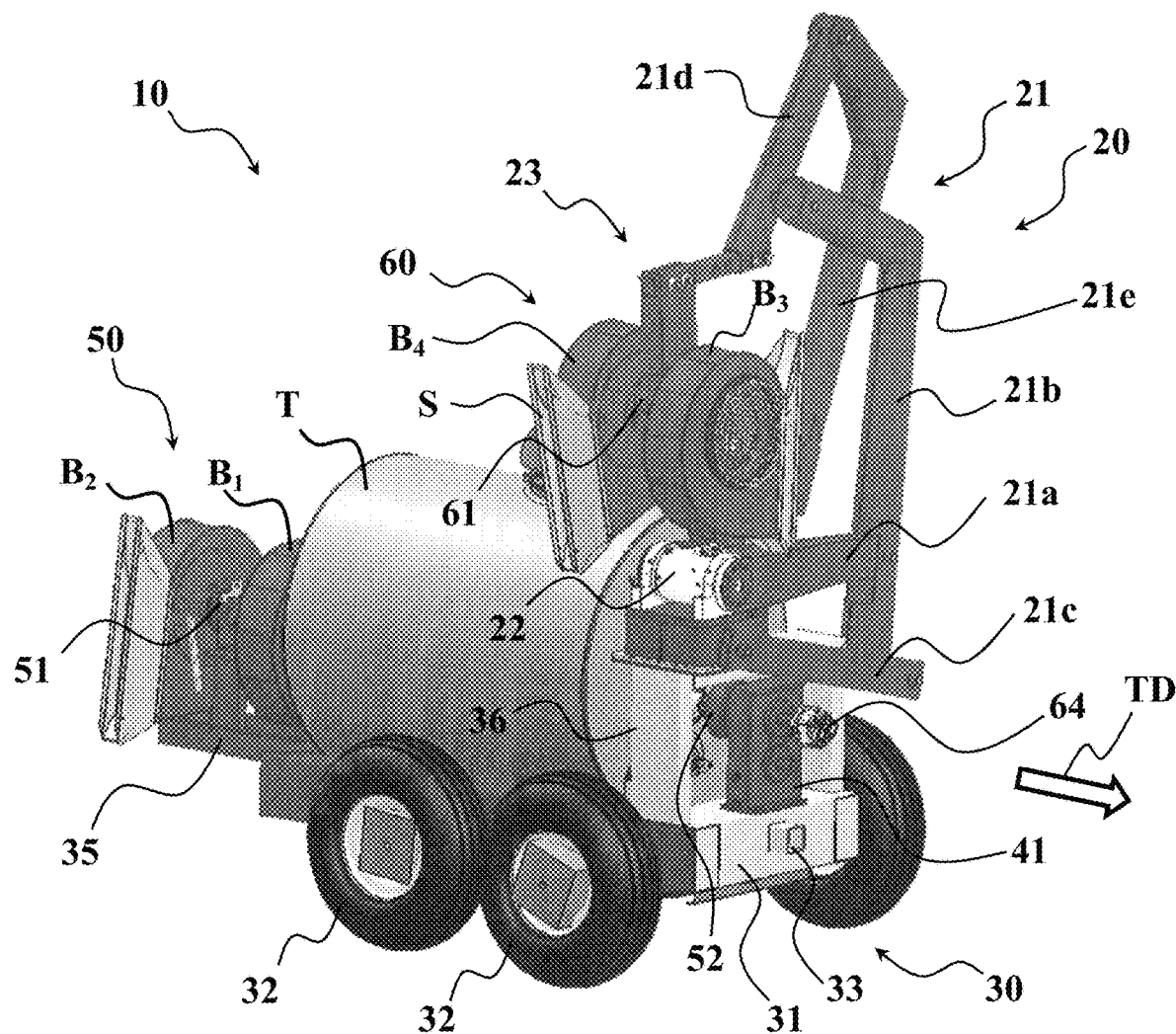
FIG. 1 is a front isometric view of an agricultural multi-row sprayer system, according to one example embodiment, with an extendable arm thereof in a stowed configuration.
Figure 2:
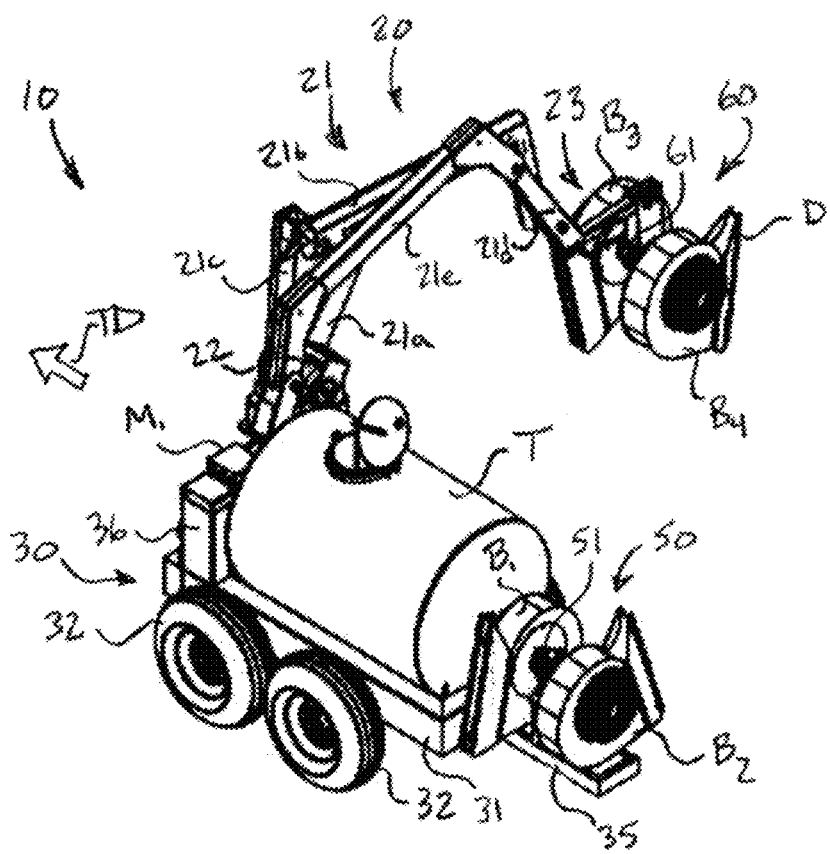
FIG. 2 is a rear isometric view of the agricultural multi-row sprayer system with the extendable arm in a deployed configuration.
Figure 3:
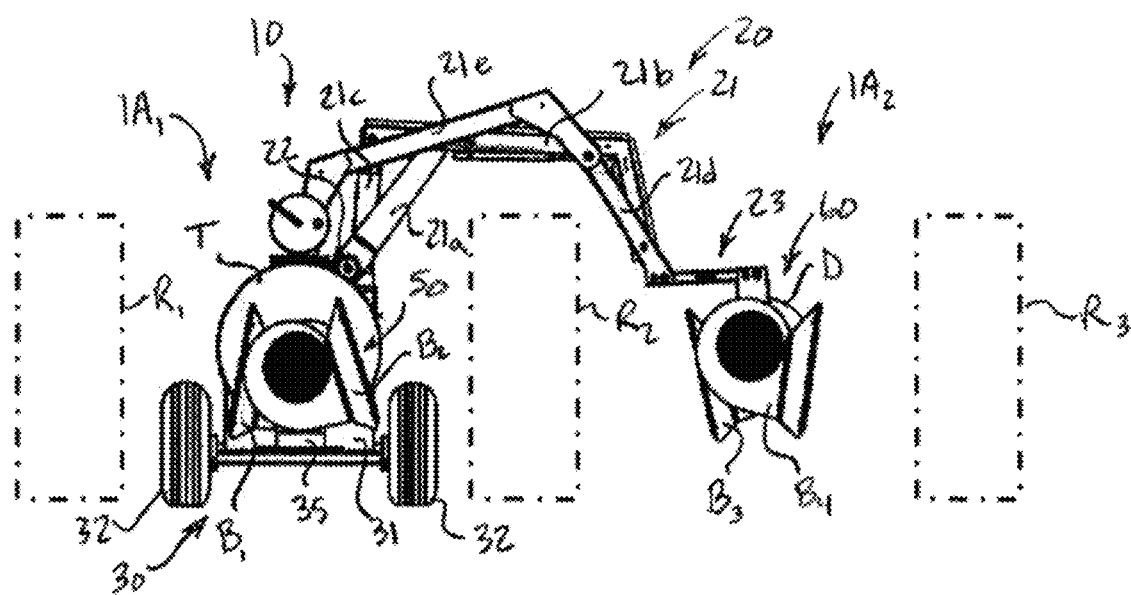
FIG. 3 is a rear elevational view of the agricultural multi-row sprayer system with a chassis thereof supporting a first sprayer arrangement in one interrow area between adjacent rows of crop, and with the extendable arm in the deployed configuration to position a second sprayer arrangement in an adjacent interrow area between adjacent overlapping rows of crop.
Figure 4:
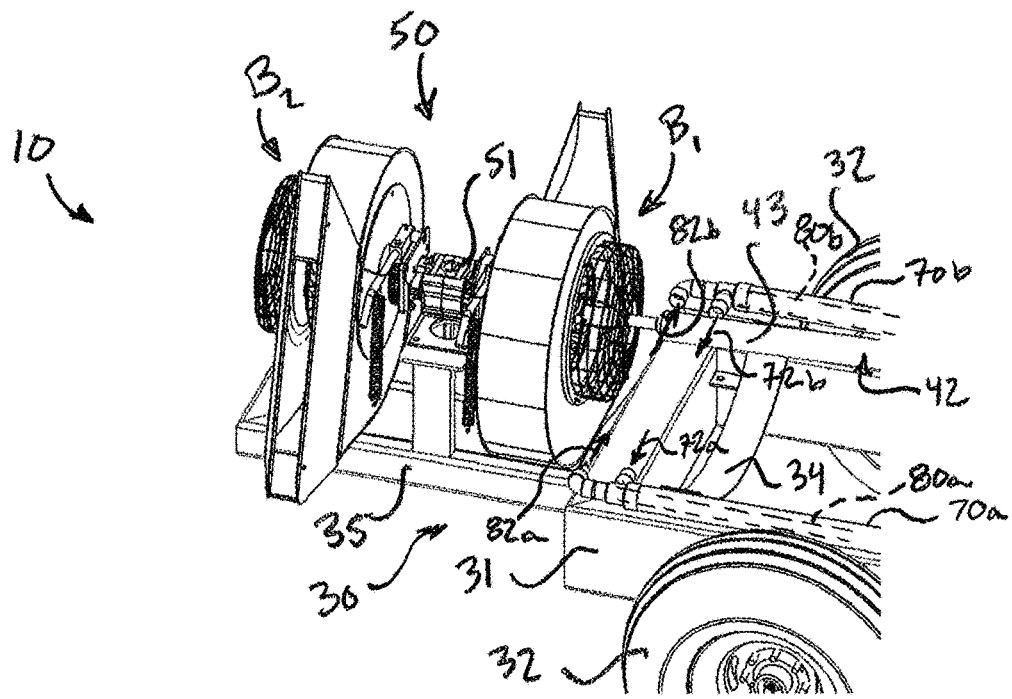
FIG. 4 is a perspective view of a portion of the agricultural multi-row sprayer system with a mixture tank thereof removed and showing the first sprayer arrangement in greater detail.
Figure 5:
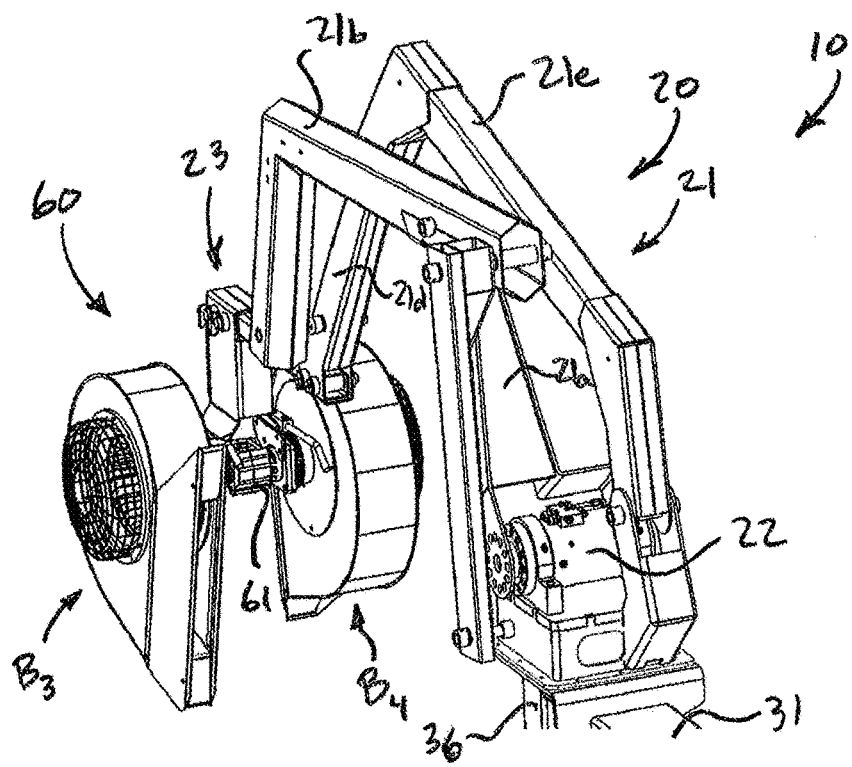
FIG. 5 is a perspective view of another portion of the agricultural multi-row sprayer system showing the extendable arm and the second sprayer arrangement in greater detail.
Figure 6:
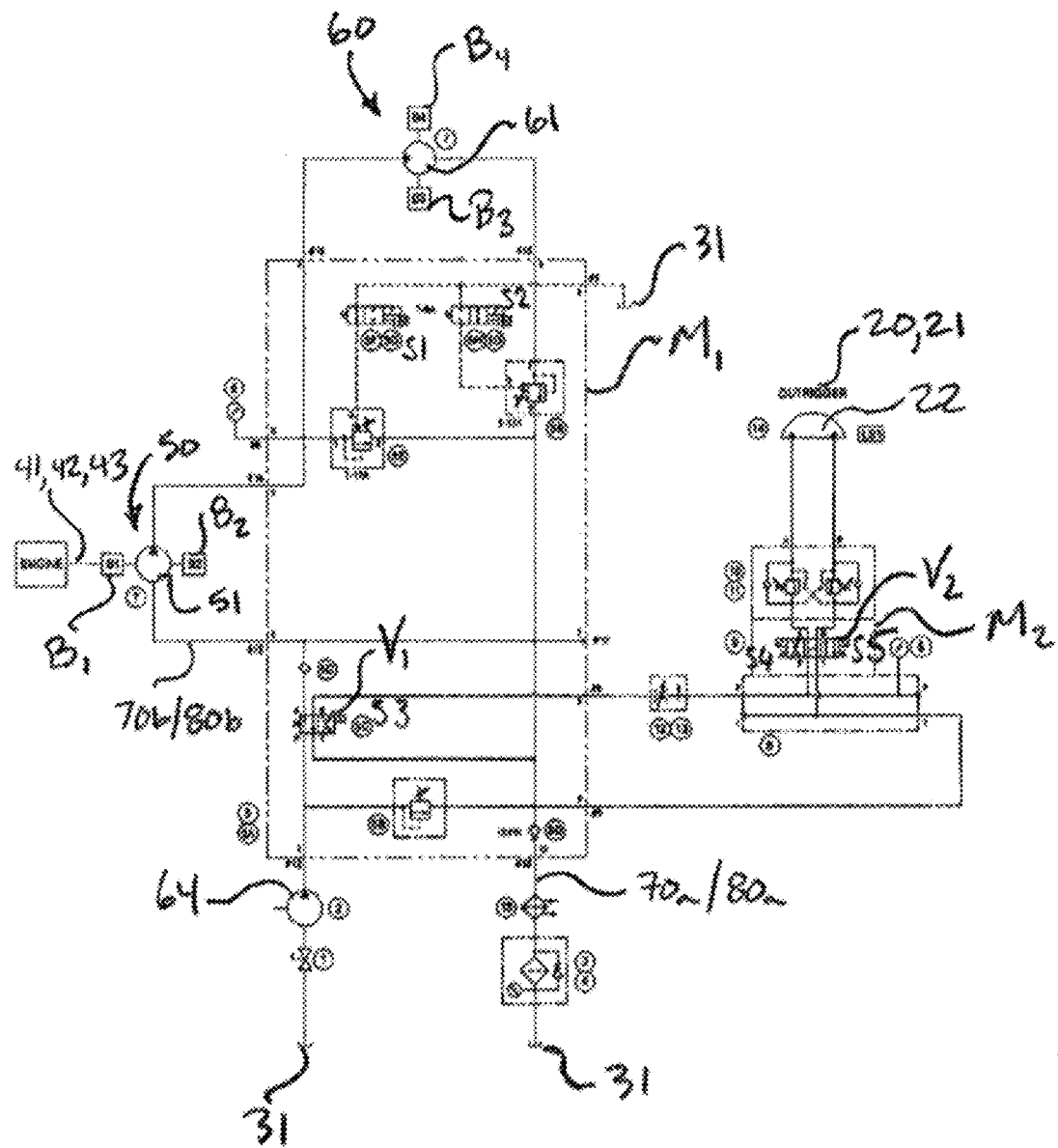
FIG. 6 is schematic diagram of a hydraulic system, according to one example embodiment, usable in connection with the agricultural multi-row sprayer system shown in FIGS. 1 through 5.

FIGS. 1 through 5 show an agricultural multi-row sprayer system 10, according to one example embodiment. FIG. 1 provides a front isometric view with an extendable arm 20 of the sprayer system 10 in a stowed configuration S. FIG. 2 provides a rear isometric view of the sprayer system 10 with the extendable arm 20 in a deployed configuration D. FIG. 3 provides a rear elevational view of the sprayer system 10 with a chassis 30 of the sprayer system 10 supporting a first sprayer arrangement 50 in one interrow area between one set of adjacent rows of crop $R_1$, $R_2$, and with the extendable arm 20 in the deployed configuration to position a second sprayer arrangement 60 in an adjacent interrow area $IA_2$ between an overlapping set of adjacent rows of crop $R_2$, $R_3$. FIG. 4 provides a perspective view of a rear end portion of the sprayer system 10 to show the first sprayer arrangement 50 in greater detail, and FIG. 5 provides a perspective view of a front end portion of the sprayer system 10 to show the extendable arm 20 and the second sprayer arrangement 60 in greater detail.

With reference to FIGS. 1 through 5, the agricultural multi-row sprayer system 10 of the example embodiment is configured as a trailerable unit in which the chassis 30 includes a structural base frame 31 supported on a pair of axle and wheel assemblies 32. The chassis 30 is attachable to a conventional tractor (not shown), for example, to be pulled up and down the rows $R_x$ of crop. For this purpose, the structural base frame 31 may include a hitch structure 33 at a front end of the chassis 30 for attaching the chassis 30 to a tractor. The structural base frame 31 of the chassis 30 may further include one or more cradles 34 for supporting a mixture tank T that holds a sprayable mixture to be applied to the target crop, a rear end portion 35 for supporting the first sprayer arrangement 50, and a front end portion 36 for supporting the extendable arm 20, which in turn supports the second sprayer arrangement 60.

Advantageously, in some embodiments, the structural base frame 31 may comprise a plurality of tubular structural members combined in a framework to define an internal fluid cavity to serve as a hydraulic oil reservoir for providing a source of hydraulic oil for one or more hydraulic components of the sprayer system 10. In this regard, the internal cavity of the structural base frame 31 (or a portion thereof) may be sealed or essentially sealed apart from one or more hydraulic oil outlets through which hydraulic oil may be withdrawn from the structural base frame 31 and one or more hydraulic oil inlets through which hydraulic oil may be returned to the structural base frame 31. Notably, the structural base frame 31 may serve as a heat sink for the hydraulic oil contained therein and may assist in cooling the hydraulic oil through conduction into the base frame 31 and through convection into the surrounding environment. The structural base frame 31 may also provide suitable ballast to assist in countering the moment arising from the extendable arm 20 during operation. In some instances, a center of gravity of the structural base frame 31 may be offset laterally from a centerline of the chassis 30 on a side opposite that of the extendable arm.

With continued reference to FIGS. 1 through 5, the chassis 30 of the sprayer system 10 may support or accommodate all or nearly all other functional components of the sprayer system 10. For example, the chassis 30 may support or accommodate a variety of hydraulic system components (e.g., pumps, motors, manifolds, valves, conduits), drive components (e.g., gear boxes, drive shafts, power transmission couplings), and other system components (e.g., spray nozzles, liquid pump for the mixture, tank agitator) used to provide various functionality described herein. As such, the sprayer system 10 may comprise a self-contained or nearly self-contained unit apart from a motive source, namely, the tractor, and a mechanical power source, e.g., a PTO (power take-off) device provided by the tractor. In other embodiments, the sprayer system 10 may be configured as a self-propelled vehicle or an autonomous vehicle.

According to the illustrated embodiment of FIGS. 1 through 5, mechanical power from a PTO device of a tractor may be supplied to various power transmission components of the sprayer system 10. For instance, the sprayer system 10 may include a speed-up gearbox 41 at a front end of the chassis 30 that is coupleable to the PTO device on the tractor to receive mechanical power and transfer it to various system components. For example, the speed-up gearbox 41 may in turn be coupled to a drive assembly 42 that extends from the front end of the sprayer system 10 to the rear end of the sprayer 10 to supply mechanical power to the first sprayer arrangement 50.

Such a drive assembly 42 may include an elongated drive shaft 43 that extends through the mixture tank T to each of two opposing blower assemblies $B_1$, $B_2$ and a hydraulic pump 51 of the first sprayer arrangement 50 provided between the blower assemblies $B_1$, $B_2$, as shown best in FIG. 4. Advantageously, the hydraulic pump 51 is configured to include counter rotating shafts (not visible) extending from opposing sides of a casing thereof to support a rotating fan element of each respective blower assembly $B_1$, $B_2$ and to cause the fan elements to rotate in opposite directions when driven by the drive assembly 42. The hydraulic pump 51 may include spur gears and/or helical gears to transfer power between the opposing protruding counter rotating shafts. In one advantageous embodiment, the hydraulic pump 51 includes a casing with functional hydraulic ports, internal helical gears and the opposing protruding counter rotating shafts.

The drive assembly 42 may further include a centrifugal clutch 52 (FIG. 1) to enable the drive shaft 43, which is coupled to the hydraulic pump 51 and blower assemblies $B_1$, $B_2$, to disengage from the power source (PTO device) of the tractor under low speed or other conditions. This can assist in disabling the blower assemblies $B_1$, $B_2$ under tractor idling conditions. It can also assist in protecting the power source and drive components under various fault conditions.

The second sprayer arrangement 60 may include a similar arrangement of opposing blower assemblies $B_3$, $B_4$ and a hydraulic motor 61 provided therebetween, as shown best in FIG. 5. The hydraulic pump 51 of the first sprayer arrangement 50 may be configured to supply hydraulic oil to the hydraulic motor 61 of the second sprayer arrangement 60 through hydraulic oil conduits (not shown) during operation to provide motive force for the blower assemblies $B_3$, B4 of the second sprayer arrangement 60 through counter rotating shafts that extend from opposing sides of the hydraulic motor 61. In this manner, the power source (PTO device) of the tractor can provide mechanical power to simultaneously drive each of the blower assemblies $B_1$, $B_2$, $B_3$, $B_4$, with the fan elements of each respective set of blower assemblies $B_1$, $B_2$ and $B_3$, $B_4$, rotating in opposite directions. Devices may also be provided to selectively engage and disengage, either manually or through mechanical assistance, each of the blower assemblies $B_1$, $B_2$, $B_3$, $B_4$ independently, such that an operator may selectively control each of the blower assemblies $B_1$, $B_2$, $B_3$, $B_4$ to discharge mixture as desired.

Advantageously, the hydraulic motor 61 is configured to include counter rotating shafts (not visible) extending from opposing sides of a casing thereof to support a rotating fan element of each respective blower assembly $B_3$, $B_4$ and to cause the fan elements to rotate in opposite directions when driven by the hydraulic oil supplied by the hydraulic pump 61 of the first sprayer arrangement 60. The hydraulic motor 61 may include spur gears and/or helical gears to transfer power between the opposing protruding counter rotating shafts. In one advantageous embodiment, the hydraulic motor 61 includes a casing with functional hydraulic ports, internal helical gears and the opposing protruding counter rotating shafts. The hydraulic pump 51 of the first sprayer arrangement 50 and the hydraulic motor 61 of the second sprayer arrangement 60 may be constructed with identical or nearly identical structures.

During operation, the hydraulic pump 51 of the first sprayer arrangement 50 may pull hydraulic oil from a primary manifold $M_1$ (FIG. 2) which in turn receives hydraulic oil from the aforementioned hydraulic reservoir defined by the structural base frame 31 of the chassis 30. In other instances, a separate hydraulic tank may be provided apart from the structural base frame 31 of the chassis 30. To assist in supplying the hydraulic oil to the hydraulic motor 61 of the second sprayer arrangement 50 via the hydraulic pump 51 of the first sprayer arrangement 50, a separate charge pump 64 (FIG. 1) may be provided to assist in charging the primary manifold $M_1$ with hydraulic oil. For this purpose, the charge pump 64 may be mechanically coupled to the speed-up gearbox 41 to be operated under the power of the PTO device of the tractor.

According to the illustrated embodiment of FIGS. 1 through 5, the extendable arm 20 comprises a linkage arrangement 21 that is configured to move the second sprayer arrangement 60 between a stowed position S above the chassis 30, as shown in FIG. 1, and a deployed position D laterally offset from the chassis 30, as shown in FIG. 2. Accordingly, as can be appreciated from FIG. 3, with the chassis 30 located in a first interrow area $IA_1$, the linkage arrangement 21 is configured to move the second sprayer arrangement 60 from the stowed position S within the first interrow area $IA_1$ to the deployed position D within the second interrow area $IA_2$ to provide multi-row spraying functionality. Advantageously, this enables the second sprayer arrangement 60 to be deployed and retracted at will throughout spraying of the rows $R_1$, $R_2$, $R_3$ of crop.

According to the illustrated embodiment, the linkage arrangement 21 is configured to move the second sprayer arrangement 60 within a plane transverse to a travel direction TD of the chassis 30; however, in other embodiments, it is appreciated that the linkage arrangement 21 may be configured to move the second sprayer arrangement 60 within a plane that is oblique to the travel direction TD. In still other embodiments, the linkage arrangement 21 may be configured to move the second sprayer arrangement 60 out of plane.

According to the illustrated embodiment of FIGS. 1 through 5, the linkage arrangement 21 is also configured to move the second sprayer arrangement 60 from the stowed positioned S (FIG. 1) to a deployed position P (FIGS. 2 and 3) along a curvilinear path that initially rises, then peaks and then falls. However, in other embodiments, the linkage arrangement 21 may be configured to move the second sprayer arrangement 60 along a trajectory having a differently shaped path, which may include, for example, linear and non-linear portions.

According to the illustrated embodiment of FIGS. 1 through 5, the linkage arrangement 21 is also configured such that a spatial orientation of the second sprayer arrangement 60 varies as the second sprayer arrangement 60 is deployed for use. However, in other embodiments, the linkage arrangement 21 may be configured such that the spatial orientation of the second sprayer arrangement 60 is maintained constant or substantially constant as the second sprayer arrangement 60 is deployed for use.

According to the illustrated embodiment of FIGS. 1 through 5, the linkage arrangement 21 is shown as comprising a six-bar linkage mechanism consisting of individual links 21a-21e, with the structural base frame 31 of the chassis 30 serving as a ground link. More particularly, the linkage arrangement 21 is arranged as a Stephenson III type mechanism comprising one four-bar loop and one five-bar loop. The input link 21a is coupled to the chassis via a hydraulic rotary actuator 22, which is controllable to pivot the input link 21a back and forth to extend and retract the arm 20 supporting the second spraying arrangement 60 as desired during operation. The hydraulic rotary actuator 22 may be controlled by hydraulic oil supplied by the charge pump 64 via the aforementioned primary manifold $M_1$ and the reservoir defined by the structural base frame 31 of the chassis 30. The linkage arrangement 21 may further include a sprayer mount assembly 23 at the distal end that is transversely adjustable to adjust a distance that the second sprayer arrangement 60 is offset from the chassis 30 when deployed.

According to the illustrated embodiment of FIGS. 1 through 5, the linkage arrangement 21 and chassis 30 may be convertible from a transport configuration (not shown), in which a motion plane of the linkage arrangement 21 is parallel to a travel direction TD of the chassis 30, and an operational configuration, in which the motion plane of the linkage arrangement 21 is perpendicular to the travel direction TD of the chassis 30. For example, the linkage arrangement 21 may be unfixed (e.g., unbolted) from its operational position, rotated ninety degrees, and then fixed (e.g., bolted) in place such that the linkage arrangement 21 extends generally longitudinally along the chassis 30. Rotation may be manual or under the control of a motor such as a rotary actuator. In some instances, the linkage arrangement 21 may be mounted to the chassis 30 via a rotatable turntable to assist in converting the sprayer system 10 between the transport configuration and the operational configuration.

In addition to the components, structures and functionality described above, the sprayer system 10 further includes a suitable liquid pump (not visible), valves and conduits (e.g., mixture conduits 80a, 80b shown in FIG. 4) for supplying the mixture from the mixture tank T to one or more nozzles (not shown) of each of the blower assemblies $B_1$, $B_2$, $B_3$, $B_4$ of the first and second sprayer arrangements 50, 60 for dispersing the mixture into high velocity turbulent streams of air discharged from each of the blower assemblies $B_1$, $B_2$, $B_3$, $B_4$ during operation to be applied to the rows $R_1$, $R_2$, $R_3$ of crop. The liquid pump may be driven by the PTO device of the tractor via the speed-up gearbox 41, such as, via a belt arrangement or other suitable power transmission components.

With reference to FIG. 4, the sprayer system 10 may include one or more hydraulic oil conduits 70a, 70b arranged to route hydraulic oil to or from one or more hydraulic components (e.g., hydraulic pump 51, hydraulic motor 61) of the sprayer system 10, and one or more mixture conduits 80a, 80b configured to route mixture between the mixture tank T and one or more nozzles (not shown) of the of the blower assemblies $B_1$, $B_2$, $B_3$, $B_4$ of the first and second sprayer arrangements 50, 60. Advantageously, the mixture conduit(s) 80a, 80b may be arranged relative to the hydraulic oil conduit(s) 70a, 70b to enable conductive heat exchange between the mixture moving through the mixture conduit(s) 80a, 80b and the hydraulic oil moving through the hydraulic oil conduit(s) 70a, 70b, as illustrated, for example, in FIG. 4. In some instances, the mixture conduit(s) 80a, 80b may be arranged relative to the hydraulic oil conduit(s) 70a, 70b such that the mixture flowing through the mixture conduit(s) 80a, 80b moves in a direction opposite of a direction of hydraulic oil moving through the hydraulic oil conduit(s) 70a, 70b, as indicated by the arrows labeled 82a, 82b and 72a, 72b, respectively. In some instances, the hydraulic oil conduit(s) 70a, 70b may be exposed to the surrounding environment and may circumferentially surround the mixture conduit(s) 80a, 80b such that heat is removed from the hydraulic oil by the mixture via conduction and heat is removed from the hydraulic oil by the surrounding environment via convection. In addition, at least one air scoop (not shown) may be arranged to direct air over the hydraulic oil conduit(s) 70a, 70b as the chassis 30 moves to enhance heat removal from the hydraulic oil via convection. For example, a respective air scoop may be providing on each of opposing sides of the chassis 30 to provide enhanced heat removal of a respective hydraulic oil conduit (e.g., hydraulic oil conduits 70a, 70b). In this manner, at least some of the heat generated by the working fluid (i.e., hydraulic oil) in operating the sprayer system 10 may be effectively removed by the mixture moving through the sprayer system 10. In addition, the mixture in the mixture tank T can serve as a variable capacity heat sink for the system hydraulics.

More particularly, and with reference to FIG. 4, fluid may be withdrawn from the mixture tank T by a suitable liquid pump (not shown) mounted to the chassis 30 and may be routed along one side of the chassis 30 via mixture conduit 80a and at least a portion of the flow of mixture may be used to supply the first spray arrangement 50 and the second spray arrangement 60 via additional mixture conduits (not shown) during operation. Some of the mixture may be discharged toward the rows $R_1$, $R_2$, $R_3$ of crop and some may return through return mixture conduit 80b running along an opposing side of the chassis 30 to be returned to the mixture tank T for reuse. In addition, hydraulic oil may be withdrawn from the hydraulic reservoir defined by the structural base frame 31 and routed along the opposing side of the chassis 30 via hydraulic oil conduit 70b to be fed to the hydraulic motor 61 of the second spray arrangement 60 by the hydraulic pump 51 of the first spray arrangement via additional hydraulic oil conduits (not shown) during operation/The hydraulic oil may return to the hydraulic reservoir defined by the structural base frame 31 through return hydraulic oil conduit 80a running along the other side of the chassis 30. Again, as illustrated in FIG. 4, the hydraulic oil conduit(s) 70a, 70b may be exposed to the surrounding environment and may circumferentially surround the mixture conduit(s) 80a, 80b such that some heat is removed from the hydraulic oil by the mixture via conduction and some heat is removed from the hydraulic oil by the surrounding environment via convection. In this manner, heat may be transferred to the mixture by the hydraulic oil prior to reaching the sprayer arrangements 50, 60 such that the temperature of the discharged mixture may be higher than a temperature of the mixture withdrawn from the mixture tank T. Discharging the mixture in such an elevated temperature assists in reducing the amount of heat that would otherwise be returned to the mixture tank without adversely affecting the crops to be treated. Advantageously, such a heat exchanger arrangement between the mixture flow and the hydraulic oil flow assists in reducing the working temperature of the hydraulic oil and leads to efficiency gains in the hydraulic system.

Other features and aspects of an example hydraulic system that may be implemented as part of the sprayer system 10 described above with reference to FIGS. 1 through 5, can be appreciated from a review of FIG. 6, which provides a schematic diagram of such an example hydraulic system. For ease of comprehension, like reference characters have been used in FIG. 6 for features and components in the schematic diagram which correlate with those of the sprayer system 10 described above with reference to FIGS. 1 through 5. One of ordinary skill in the relevant art of hydraulics will readily understand the functionality provided by the hydraulic system outlined in the schematic diagram. For example, it will be understood that suitable directional valves V1, V2 and associated manifolds M1, M2 may be used to route hydraulic oil on demand to the hydraulic rotary actuator 22 to control the extension or retraction of the extendable arm 20 to selectively deploy the second sprayer arrangement 60 to an adjacent interrow area.

Again, although many features and aspects disclosed herein are described in the context of an agricultural multi-row sprayer system having an extendable arm for deploying a sprayer arrangement into an adjacent interrow area, it is appreciated that various features and aspects disclosed herein may be provided in conjunction with a wide variety of agricultural equipment and other equipment.

Moreover, features and aspects of the various embodiments described above can be combined to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An agricultural multi-row sprayer system, comprising:

a chassis;

a tank coupled to the chassis to accommodate a sprayable mixture to be applied to rows of a crop;

a first sprayer arrangement coupled to the chassis and arranged to spray the mixture supplied by the tank from a first interrow area located between a first set of adjacent rows of the crop;

a second sprayer arrangement coupled to the chassis and selectively deployable to spray the mixture supplied by the tank from a second interrow area located between a second set of adjacent rows of the crop;

a linkage arrangement having a distal end that supports the second sprayer arrangement and having an input link movably coupled to the chassis, the input link being controllably manipulable to selectively deploy the second sprayer arrangement to the second interrow area;

at least one hydraulic oil conduit arranged to route hydraulic oil to or from a hydraulic component of the agricultural multi-row sprayer system; and at least one mixture conduit configured to route the mixture from the tank to one or more nozzles of the first and second sprayer arrangements, and wherein the mixture conduit is arranged relative to the hydraulic oil conduit to enable conductive heat exchange between the mixture moving through the mixture conduit and the hydraulic oil moving through the hydraulic oil conduit.

2. The agricultural multi-row sprayer system of claim 1, wherein, with the chassis located in the first interrow area, the linkage arrangement is configured to move the second sprayer arrangement between a stowed position above the chassis within the first interrow area and a deployed position within the second interrow area.

3. The agricultural multi-row sprayer system of claim 1, wherein the linkage arrangement defines at least a portion of an extendable arm that is configured to move the second sprayer arrangement within a plane transverse to a travel direction of the chassis.

4. The agricultural multi-row sprayer system of claim 1, wherein the linkage arrangement defines at least a portion of an extendable arm that is configured to move the second sprayer arrangement from a stowed positioned to a deployed position along a curvilinear path that initially rises, then peaks and then falls.

5. The agricultural multi-row sprayer system of claim 4, wherein the extendable arm is further configured such that a spatial orientation of the second sprayer arrangement varies as the second sprayer arrangement is deployed.

6. The agricultural multi-row sprayer system of claim 1, wherein the linkage arrangement comprises a six-bar linkage mechanism.

7. The agricultural multi-row sprayer system of claim 6, wherein the six-bar linkage mechanism comprises one four-bar loop and one five-bar loop.

8. The agricultural multi-row sprayer system of claim 6, wherein the six-bar linkage mechanism is a Stephenson III type.

9. The agricultural multi-row sprayer system of claim 1, wherein the input link of the linkage arrangement is coupled to the chassis via a hydraulic rotary actuator.

10. The agricultural multi-row sprayer system of claim 1, wherein the first sprayer arrangement includes a pair of blower assemblies mounted to a rear end of the chassis with each blower assembly oriented to spray toward a respective row of crop on opposing sides of the first interrow area, and wherein the second sprayer arrangement includes a pair of blower assemblies mounted to the distal end of the linkage arrangement with each blower assembly oriented to spray toward a respective row of crop on opposing sides of the second interrow area when the second sprayer arrangement is in a deployed position within the second interrow area.

11. The agricultural multi-row sprayer system of claim 1, wherein the first sprayer arrangement is mounted to a rear end of the chassis and the linkage arrangement supporting the second sprayer arrangement is coupled to a front end of the chassis.

12. The agricultural multi-row sprayer system of claim 1, wherein the chassis includes a structural base frame supported on one or more wheel and axle assemblies, the structural base frame defining a hydraulic oil reservoir to accommodate hydraulic oil for driving one or more hydraulic motors of the agricultural multi-row sprayer system.

13. The agricultural multi-row sprayer system of claim 1, wherein the first sprayer arrangement includes a hydraulic pump and the second sprayer arrangement includes a hydraulic motor, and wherein the hydraulic pump of the first sprayer arrangement is configured to supply hydraulic oil to the hydraulic motor of the second sprayer arrangement.

14. The agricultural multi-row sprayer system of claim 1, wherein the first sprayer arrangement includes a pair of blower assemblies configured to rotate in opposite directions and a hydraulic pump coupled therebetween, the pair of blower assemblies and the hydraulic pump being driven by a common drive assembly.

15. The agricultural multi-row sprayer system of claim 14 wherein the drive assembly includes a centrifugal clutch to enable a driven shaft that is coupled to the hydraulic pump and blower assemblies to disengage from a drive power source under low speed or other conditions.

16. The agricultural multi-row sprayer system of claim 1, wherein the second sprayer arrangement includes a pair of blower assemblies and a hydraulic motor coupled therebetween, the pair of blower assemblies being driven in opposite directions by the hydraulic motor.

17. The agricultural multi-row sprayer system of claim 1, wherein the mixture conduit is arranged relative to the hydraulic oil conduit such that the mixture flowing through the mixture conduit moves in a direction opposite of a direction that the hydraulic oil moves through the hydraulic oil conduit.

18. The agricultural multi-row sprayer system of claim 1, wherein the hydraulic oil conduit is exposed to the surrounding environment and circumferentially surrounds the mixture conduit such that heat is removed from the hydraulic oil by the mixture via conduction and heat is removed from the hydraulic oil by the surrounding environment via convection.

19. The agricultural multi-row sprayer system of claim 1, further comprising:
at least one air scoop arranged to direct air over the hydraulic oil conduit as the chassis moves to enhance heat removal from the hydraulic oil via convection.

20. An agricultural sprayer system, comprising:
a chassis;
a tank coupled to the chassis to accommodate a sprayable mixture to be applied to a crop;
at least one sprayer arrangement coupled to the chassis and arranged to spray the mixture supplied by the tank to the crop;
at least one hydraulic oil conduit arranged to route hydraulic oil to or from a hydraulic component of the agricultural sprayer system; and
at least one mixture conduit configured to route the mixture from the tank to one or more nozzles of the at least one sprayer arrangement, and
wherein the mixture conduit is arranged relative to the hydraulic oil conduit to enable conductive heat exchange between the mixture moving through the mixture conduit and the hydraulic oil moving through the hydraulic oil conduit.

* * * * *